(12) United States Patent
Yang et al.

(10) Patent No.: US 10,595,080 B2
(45) Date of Patent: *Mar. 17, 2020

(54) METHOD AND APPARATUS FOR TRANSMITTING AND RECEIVING SIGNAL IN MULTIMEDIA SYSTEM

(71) Applicants: Samsung Electronics Co., Ltd., Suwon-si, Gyeonggi-do (KR); KYONGGI UNIVERSITY INDUSTRY & ACADEMIA COOPERATION FOUNDATION, Suwon-si, Gyeonggi-do (KR)

(72) Inventors: Hyun-Koo Yang, Seoul (KR); Byoung-Dai Lee, Suwon-si (KR); Young-Sun Ryu, Seongnam-si (KR)

(73) Assignees: Samsung Electronics Co., Ltd., Suwon-si (KR); KYONGGI UNIVERSITY INDUSTRY & ACADEMIA COOPERATION FOUNDATION, Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/381,574

(22) Filed: Apr. 11, 2019

(65) Prior Publication Data

US 2019/0246168 A1   Aug. 8, 2019

Related U.S. Application Data

(63) Continuation of application No. 15/190,766, filed on Jun. 23, 2016, now Pat. No. 10,306,297.

(51) Int. Cl.
*H04N 21/434* (2011.01)
*H04N 21/643* (2011.01)
(Continued)

(52) U.S. Cl.
CPC ... *H04N 21/4345* (2013.01); *H04N 21/64322* (2013.01); *H04N 21/6543* (2013.01); *H04N 21/858* (2013.01)

(58) Field of Classification Search
CPC .......... H04N 21/236; H04N 21/23614; H04N 21/4307; H04N 21/4345; H04N 21/458; H04N 21/47
See application file for complete search history.

(56) References Cited

U.S. PATENT DOCUMENTS 6,061,719 A * 5/2000 Bendinelli ............. H04N 7/088
                                                    348/E5.112
7,028,327 B1 * 4/2006 Dougherty ......... H04N 7/17318
                                                    348/E7.071
(Continued)

FOREIGN PATENT DOCUMENTS

EP      2712187 A1    3/2014
WO   2013/080450 A1   6/2013
(Continued)

OTHER PUBLICATIONS

Media transport system using digital broadcasting with MMT, ARIB STDB60, Radio Industry Association, Jul. 31, 2014, 1.0 edition, pp. 123-128, 146-148.
(Continued)

*Primary Examiner* — Pankaj Kumar
*Assistant Examiner* — Timothy R Newlin
(74) *Attorney, Agent, or Firm* — Jefferson IP Law, LLP

(57) ABSTRACT

A method of operating a transmitting apparatus in a multimedia system is provided. The method includes transmitting a data unit of a multimedia service including event information related to an event, wherein the event includes notification to an application, the notification indicating that an action is to be taken.

4 Claims, 8 Drawing Sheets

(51) Int. Cl.
*H04N 21/6543* (2011.01)
*H04N 21/858* (2011.01)

(56) References Cited

U.S. PATENT DOCUMENTS

| | | | |
|---|---|---|---|
| 8,194,642 B2 | 6/2012 | Rosenberg et al. | |
| 8,555,313 B2* | 10/2013 | Newnam | H04N 5/04 725/32 |
| 8,813,131 B2* | 8/2014 | Han | H04N 21/812 725/42 |
| 9,288,554 B2* | 3/2016 | Lee | H04N 7/08 |
| 9,661,371 B2* | 5/2017 | Moon | H04N 21/23617 |
| 2002/0162121 A1* | 10/2002 | Mitchell | H04N 7/165 725/135 |
| 2003/0051253 A1* | 3/2003 | Barone, Jr. | H04N 7/088 725/112 |
| 2008/0064326 A1 | 3/2008 | Foster et al. | |
| 2011/0119388 A1 | 5/2011 | Attansio et al. | |
| 2013/0074141 A1* | 3/2013 | Hwang | H04N 21/8126 725/116 |
| 2013/0305305 A1* | 11/2013 | Park | H04N 21/631 725/109 |
| 2014/0334504 A1* | 11/2014 | Yie | H04H 20/18 370/474 |
| 2014/0344875 A1* | 11/2014 | Bae | H04N 21/2381 725/109 |
| 2014/0344883 A1 | 11/2014 | Kitazato et al. | |
| 2015/0120956 A1* | 4/2015 | Bouazizi | H04L 65/602 709/231 |
| 2015/0237417 A1 | 8/2015 | Kitazato | |

FOREIGN PATENT DOCUMENTS

| | | |
|---|---|---|
| WO | 2014/045893 A1 | 3/2014 |
| WO | 2015065028 A1 | 5/2015 |

OTHER PUBLICATIONS

Japanese Office Action dated Nov. 19, 2019, issued in Japanese Application No. 2017-566110.

* cited by examiner

METHOD AND APPARATUS FOR TRANSMITTING AND RECEIVING SIGNAL IN MULTIMEDIA SYSTEM

CROSS-REFERENCE TO RELATED APPLICATION(S)

This application is a continuation application of prior application Ser. No. 15/190,766, filed on Jun. 23, 2016, which was based on and claimed priority under 35 U.S.C § 119(a) of a Korean patent application number 10-2015-0089353, filed on Jun. 23, 2015, and of a Korean patent application number 10-2015-0158360, filed on Nov. 11, 2015 in the Korean Intellectual Property Office, the disclosure of which is incorporated by reference herein in its entirety.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) KYONGGI UNIVERSITY INDUSTRY & ACADEMIA COOPERATION FOUNDATION.

TECHNICAL FIELD

The present disclosure relates to a method and apparatus for transmitting and receiving a signal in a multimedia system. More particularly, the present disclosure relates to a method and apparatus for transmitting and receiving event information related to an event in a multimedia system.

BACKGROUND

A multimedia service denotes a service such as a conversation service such as videophone, a streaming service such as a video on demand (VOD) service, a multicast and broadcast service, and/or the like.

A real-time multimedia service may be classified into a conversation service, an interactive service, and a streaming service based on a type of a service. The real-time multimedia service may be classified into unicast, multicast, and broadcast based on the number of users which join the real-time multimedia service.

A moving picture experts group-2 transport stream (MPEG-2 TS) is a technology used for transporting multimedia contents, and a typical transport technology for transporting bit streams that a plurality of broadcast programs (a plurality of coded video bit streams) are multiplexed in a transport environment that an error exists.

A moving picture experts group (MPEG) media transport technology as one of multimedia transport technologies for supporting a multimedia service based on an MPEG technology has been proposed. A MPEG media transport (MMT) technology is a new technology of an MPEG for providing various types of multimedia services through various terminals such as a television (TV), a mobile device, and/or the like in various types of network environments. For example, the MMT technology may be applied for effectively transporting complex contents through a heterogeneous network. Here, the complex contents denote a collection of contents which have a multimedia element by a video, audio, application, and/or the like. For example, the heterogeneous network may be a network including a broadcast network, a mobile communication network, and the like.

For supporting an application program service based on a hybrid transport technology that a broadcast network organically interworks with a communication network, there is a need for providing signaling information thereby a terminal may receive data or file required to run the application program service using the broadcast network or the communication network, and recognize and select the application program service and data related to the application program service.

So, there is a need for transmitting and receiving signaling information for providing an application program service in a system using an MMT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting and receiving a signal in a multimedia system.

Another aspect of the present disclosure is to propose an apparatus and method for transmitting and receiving event information related to an event in a multimedia system.

Another aspect of the present disclosure is to provide an apparatus and method for providing event information related to an event with a multimedia service in a multimedia system.

In accordance with an aspect of the present disclosure, a method of operating a transmitting apparatus in a multimedia system is provided. The method includes transmitting a data unit of a multimedia service including event information related to an event, wherein the event includes notification to an application, the notification indicating that an action is to be taken.

In accordance with another aspect of the present disclosure, a method of operating a transmitting apparatus in a multimedia system is provided. The operating method includes transmitting first information indicating presence of a data unit of a multimedia service including event information related to an event, wherein the event includes notification to an application, the notification indicating that an action is to be taken.

In accordance with another aspect of the present disclosure, a method of operating a receiving apparatus in a multimedia system is provided. The method includes receiving a data unit of a multimedia service including event information related to an event, wherein the event includes notification to an application, the notification indicating that an action is to be taken.

In accordance with another aspect of the present disclosure, a method of operating a receiving apparatus in a multimedia system is provided. The method includes receiving first information indicating presence of a data unit of a multimedia service including event information related to an event, wherein the event includes notification to an application, the notification indicating that an action is to be taken.

In accordance with another aspect of the present disclosure, a transmitting apparatus in a multimedia system is provided. The transmitting apparatus includes a transmitter configured to transmit a data packet of a multimedia service including event information related to an event, wherein the event includes notification to an application, the notification indicating that an action is to be taken.

In accordance with another aspect of the present disclosure, a transmitting apparatus in a multimedia system is provided. The transmitting apparatus includes a transmitter configured to transmit first information indicating presence of a data unit of a multimedia service including event information related to an event, wherein the event includes notification to an application, the notification indicating that an action is to be taken.

In accordance with another aspect of the present disclosure, a receiving apparatus in a multimedia system is provided. The receiving apparatus includes a receiver configured to receive a data unit of a multimedia service including event information related to an event, wherein the event includes notification to an application, the notification indicating that an action is to be taken.

In accordance with another aspect of the present disclosure, a receiving apparatus in a multimedia system is provided. The receiving apparatus includes a receiver configured to receive first information indicating presence of a data unit of a multimedia service including event information related to an event, wherein the event includes notification to an application, the notification indicating that an action is to be taken.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document the terms "include" and "comprise," as well as derivatives thereof, mean inclusion without limitation, the term "or," is inclusive, meaning and/or, the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
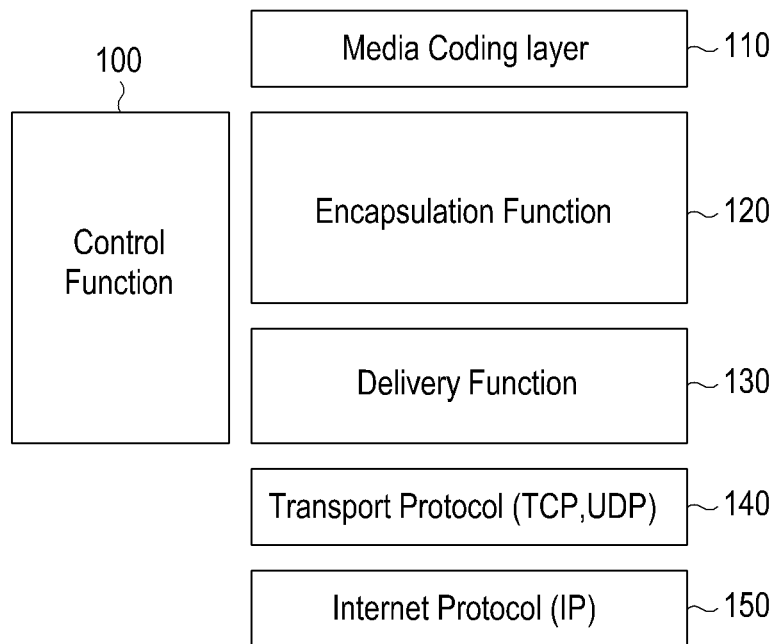
FIG. 1 schematically illustrates a layer structure of an MPEG media transport (MMT) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component.

For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an moving picture experts group phase 1 or phase 2 (MPEG-1 or MPEG-2) audio layer 3 (MP3) player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a terminal may be an electronic device.

According to various embodiments of the present disclosure, a transmitting apparatus may be a service provider or a terminal.

According to various embodiments of the present disclosure, a receiving apparatus may be a terminal or a service provider.

According to various embodiments of the present disclosure, a transmitting and receiving apparatus may be a terminal or a service provider.

According to various embodiments of the present disclosure, it will be assumed that the term terminal may be interchangeable with the term mobile station (MS), wireless terminal, mobile device, user equipment (UE), and/or the like.

An embodiment of the present disclosure proposes an apparatus and method for transmitting and receiving a signal in a multimedia system.

An embodiment of the present disclosure proposes an apparatus and method for transmitting and receiving event information related to an event in a multimedia system.

An embodiment of the present disclosure proposes an apparatus and method for providing event information related to an event with a multimedia service in a multimedia system.

An apparatus and method proposed in an embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport MMT system and/or the like. Here, an MPEG media transport will be referred to as MMT.

A method and apparatus proposed in an embodiment of the present disclosure may be applied to an advanced television systems committee (ATSC) system which is based on an MMT scheme.

For convenience, in various embodiments of the present disclosure, it will be assumed that a multimedia system is based on an MMT scheme.

An MMT protocol (MMTP) defines an application layer protocol for delivering a delivery frame including an MMT payload format (PF) through an internet protocol (IP) network.

An MMT payload includes an MMT payload format, and is designed thereby effectively being delivered. An MMTP defines encapsulation formats, delivery protocols, and signaling message formats for effectively delivering MPEG media data through heterogeneous IP networks.

An MMT technology defines a data model such as a package, an asset, and the like. The package denotes independent contents such as one movie, and the asset denotes a logical entity classifying elements such as an image, a voice, data, and/or the like included in contents. Here, one package may include a plurality of assets. For convenience, the term asset may be interchangeable with the term MMT asset, and the term package may be interchangeable with the term MMT package.

A layer structure of an MMT system according to an embodiment of the present disclosure will be described with reference to FIG. 1.

FIG. 1 schematically illustrates a layer structure of an MMT system according to an embodiment of the present disclosure.

Referring to FIG. 1, a layer structure of an MMT system configures a multimedia data packet, and includes a media coding layer 110 which transfers the multimedia data packet, an encapsulation function layer 120, a delivery function layer 130, a transport protocol layer 140, an IP layer 150, and an control function layer 100. The term encapsulation function layer may be interchangeable with the term Layer E, the term delivery function layer may be interchangeable with the term Layer D, and the term control function layer may be interchangeable with the term Layer C.

According to an embodiment of the present disclosure, the media coding layer 110 and the encapsulation function layer 120 operate as a multimedia data generator which generates multimedia contents and/or multimedia data according to a multimedia service.

The delivery function layer 130 operates as a multimedia data configuring unit which configures a multimedia data packet based on multimedia data input from a multimedia data generator. The delivery function layer 130 which corresponds to the multimedia data configuring unit configures header information by identifying at least one multimedia data provided from the multimedia data generator, and configures a multimedia data packet by combining the header information and the at least one multimedia data.

Multimedia data compressed in the media coding layer 110 is packaged as a format similar to a file format through the encapsulation function layer 120. That is, the encapsulation function layer 120 generates a data segment as a unit for an MMT service based on coded media data or stored media data provided from the media coding layer 110, and generates access units for the MMT service using the data segment. Here, an access unit denotes the smallest media data entity to which timing information is attributed. The encapsulation function layer 120 generates a packet format for generation, storage, and transport of complex contents by combining and/or dividing the access units.

The delivery function layer 130 converts a data unit(s) output from the encapsulation function layer 120 into an MMT payload format, and adds an MMT transport packet header to the MMT payload format to configure an MMT transport packet or configures a real-time protocol (RTP) packet using an RTP as an existing transport protocol.

A packet, i.e., an MMT transport packet or an RTP packet, configured in the delivery function layer 130 is generated as an IP packet in the IP layer 150 after passing the transport protocol layer 140 which supports a protocol such as a user datagram protocol (UDP) or a transport control protocol (TCP), and the generated IP packet is transported. The transport protocol layer 140 and the IP layer 150 may operate as a data transporter.

Further, the control function layer 100 which may optionally exist generates control information or signaling information necessary for transport of data and transmits the control information or signaling information with the data, or transmits the control information or signaling information using an individual signaling means.

The MMT payload format generated in the delivery function layer 130 defines a logical structure of a media unit(s) to be delivered by an MMT protocol or an RTP.

An MMT payload is specified by a payload format for delivering an encapsulated data unit or other information according to MMT layer protocols or other existing application transport protocols. The MMT payload provides information on streaming and information on file transfer.

In streaming, a data unit may be an MMT media fragment unit (MFU) or an MMT media processing unit (MPU). For convenience, it will be noted that the term MMT MFU may be interchangeable with the term MFU, and the term MMT MPU may be interchangeable with the term MPU.

For file transfer, a data unit may be an MMT asset and an MMT package.

A layer structure of an MMT system according to an embodiment of the present disclosure has been described with reference to FIG. 1, and configuration of an MMT payload in an MMT system according to an embodiment of the present disclosure will be described with reference to FIG. 2.

Figure 2:
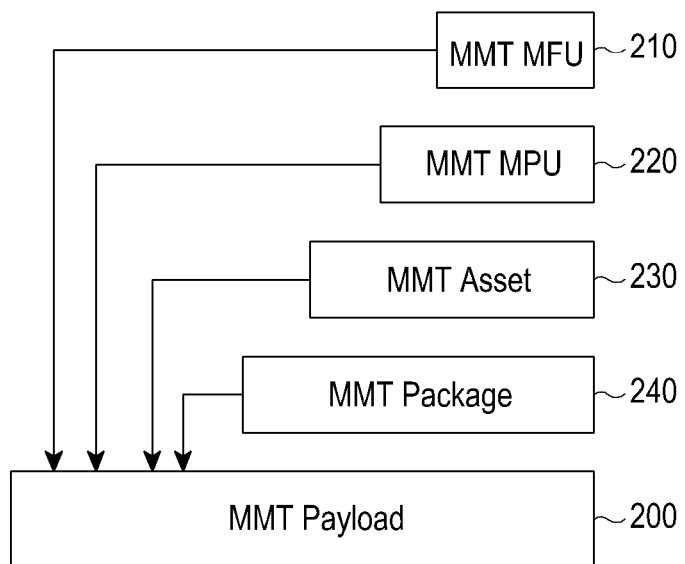
FIG. 2 schematically illustrates configuration of an MMT payload in an MMT system according to an embodiment of the present disclosure.

FIG. 2 schematically illustrates configuration of an MMT payload in an MMT system according to an embodiment of the present disclosure.

Referring to FIG. 2, an MMT payload 200 may include at least one of at least one MMT MFU 210, at least one MMT MPU 220, at least one MMT asset 230, and an MMT package.

The MMT MFU 210 is independent from any media CODEC, and denotes a generic container including coded media data which is independently decodable by a media decoder.

The MMT MFU 210 denotes a fragment of the MMT MPU 220, and is a minimum unit which is independently decodable. For example, if a coding operation is performed using one frame as an access unit, the MMT MFU 210 may be one video frame, or one slice included in one frame.

The MMT MPU 220 is a container including one or more MMT MFUs and additional information delivery and processing, and may include various number of MMT MFUs generated from different access units. The MMT MPU 220 denotes a coded media data unit which is completely and independently decodable by an MMT compliant entity, and may have a specific size according to an application environment. For example, in video, the MMT MPU 220 may have a size of 1 group of picture (GOP). As another example, the MMT MPU 220 may include a plurality of picture frames included in 1 GOP, and the MMT MFU (210) may include each picture frame. For example, 1 GOP may be video of 1 second. The MMT asset 230 is a data entity which is composed of one or more MMT MPUs, and is the largest data unit to which the same MMT composition information (MMT-CI) or MMT transport characteristics (MMT-TC) is applied. The MMT asset 230 includes only one type of data including packaged or multiplexed data. For example, each MMT asset 230 may be one of at least part of an elementary stream of audio, a MPEG user interface (MPEG-U) widget package, at least part of an MPEG-2 transport stream, at least part of an MPEG-4 (MP4) file, and all or least part of an MMT package.

For convenience, it will be noted that the term elementary stream may be interchangeable with the term ES, the term transport stream may be interchangeable with the term TS, the term MMT-CI may be interchangeable with the term CI, and the term MMT-TC may be interchangeable with the term transport characteristics (TC). Here, an elementary stream is defined by a specific media CODEC, and may be logically one or more MMT assets. The MMT asset 230 which supports a layered CODEC and a multi-view CODEC may overlap with other MMT assets.

The MMT-CI denotes information which defines spatial and temporal relationship of MMT assets, and the MMT-TC defines a quality of service (QoS) required for delivering MMT assets. The MMT-TC may be expressed as asset delivery characteristics (ADC) for a specific delivery environment.

The MMT package 240 is defined as a collection of coded media data and related information which is processed by an MMT compliant entity.

Configuration of an MMT payload in an MMT system according to an embodiment of the present disclosure has been described with reference to FIG. 2, and a logical structure of an MMT package in an MMT system according to an embodiment of the present disclosure will be described with reference to FIG. 3.

Figure 3:
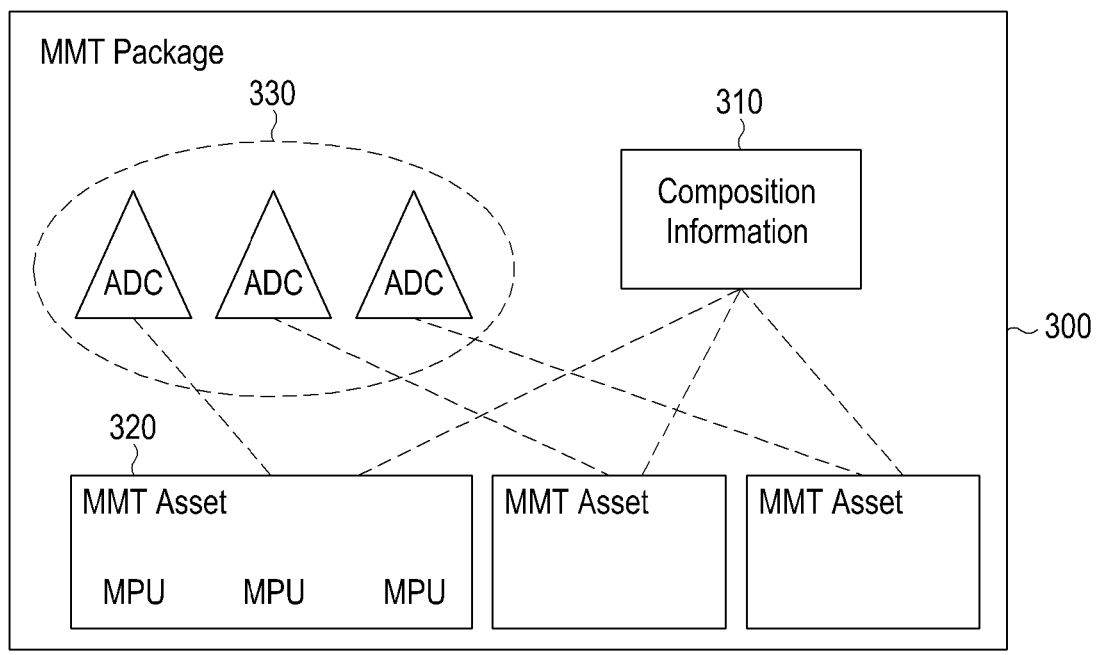
FIG. 3 schematically illustrates a logical structure of an MMT package in an MMT system according to an embodiment of the present disclosure.

FIG. 3 schematically illustrates a logical structure of an MMT package in an MMT system according to an embodiment of the present disclosure.

Referring to FIG. 3, an MMT package 300 includes one or more MMT assets 320 and one or more ADCs 330 indicating MMT-CI 310 and MMT-TC.

The MMT package 300 includes description information such as an identifier (ID) and location information of the MMT assets 320, and the MMT assets 320 within the MMT package 300 may be multiplexed or concatenated.

Processing for the MMT package 300 may be performed on an MPU basis. The one or more MMT assets 320 is a collection of one or more MPUs which has the same MMT asset ID, and TC related to each of the one or more MMT assets 320 is expressed by the one or more ADCs 330. The one or more ADCs 330 may be used for configuring parameters of an MMT payload and header information of an MMT packet by an entity which packetizes the MMT package 300.

Configuration information for an MMT package and information required for a terminal to receive and consume the configuration information for the MMT package are transmitted through an MMT signaling message. In an MMT system, an MMT signaling function area defines a message format related to media consumption and media delivery.

In an MMT system, messages related to media consumption provide information required for consuming transported media data, and these are defined as the following.

A package access (PA) message which is used for a use similar to a program map table (PMY) of an MPEG-2 TS includes all information required for presenting a transported package. The PA message is a message which needs to be firstly transmitted for receiving and consuming an MMT package, and individual information may be updated through an additional message.

A media presentation information (MPI) message which provides expression information is used for transmitting various expression information such as CI defined in an international organization for standardization (ISO)/international electronical committee (IEC) 23008-11, media presentation description (MPD) defined ISO/IEC 23009-1, and/or the like.

An MMT package table (MPT) message provides information on a transported MMT package. The MPT message provides an ID of the MMT package, MMT asset information included in the MMT package, and the like. For convenience, the term MPT may be interchangeable with the term MMT package (MP) table.

A clock relation information (CRI) message provides mapping information between a network time protocol (NTP) time stamp and a system timing clock (STC) of an MPEG-2 for synchronization between an MMT asset and an MPEG-2 ES.

A device capability information (DCI) message provides terminal performance information required for media consumption.

Meanwhile, an innovative technology which enables the next generation broadcast and multimedia service such as a high-definition immersive broadcast technology such as a ultra high-definition television (UHDTV), a 3-dimenstion TV (3DTV), a multi-view TV, and the like, an N-screen service technology for organically using various types of fixed and portable multimedia devices, and the like, as well as broadcast-communication convergence, and a development of transport network, has been proposed.

An application program service which provide various additional information by interworking with a broadcast program or independently provides various additional information based on a hybrid transport technology which enables a convergence-type multimedia service by causing that a broadcast network and a communication network organically interwork is regarded as an essential success factor of the next generation broadcast service, as well as provision of image contents in which reality and realism are maximized. For convenience, it will be noted that the term application program service may be interchangeable with the term application.

A typical one of an application program service includes a viewer-participation service, for example, a text message, a quiz, a poll, a survey, a popularity vote, and the like, electronic commerce such as ticket reservation, auction, an electronic coupon, mobile download, and the like, an application program service which may be provided independently from a broadcast program such as weather, sports, and games, a portal service, targeted advertisements, and the like.

In order for a terminal to support an application program service, signaling information is required for receiving data or file required to run the application program service using a broadcast network or a communication network, and recognizing and selecting the application program service and related data.

The signaling information related to the application program service may be classified to two types. That is, the signaling information may be classified into signaling information which provides the overall attribute for an individual service such as an application program service list, an application program service name, transport information, and the like, and event information which controls an operation of an application program service. An application program service which interworks with a broadcast program may provide more various and rich broadcast service by transporting event information with the broadcast program. Here, an event includes notification, for example, timed notification to an application program service, the timed notification indicating that an action is to be taken.

An operating process of a terminal for running an application program service in an MMT system according to an embodiment of the present disclosure will be described with reference to FIG. 4.

Figure 4:
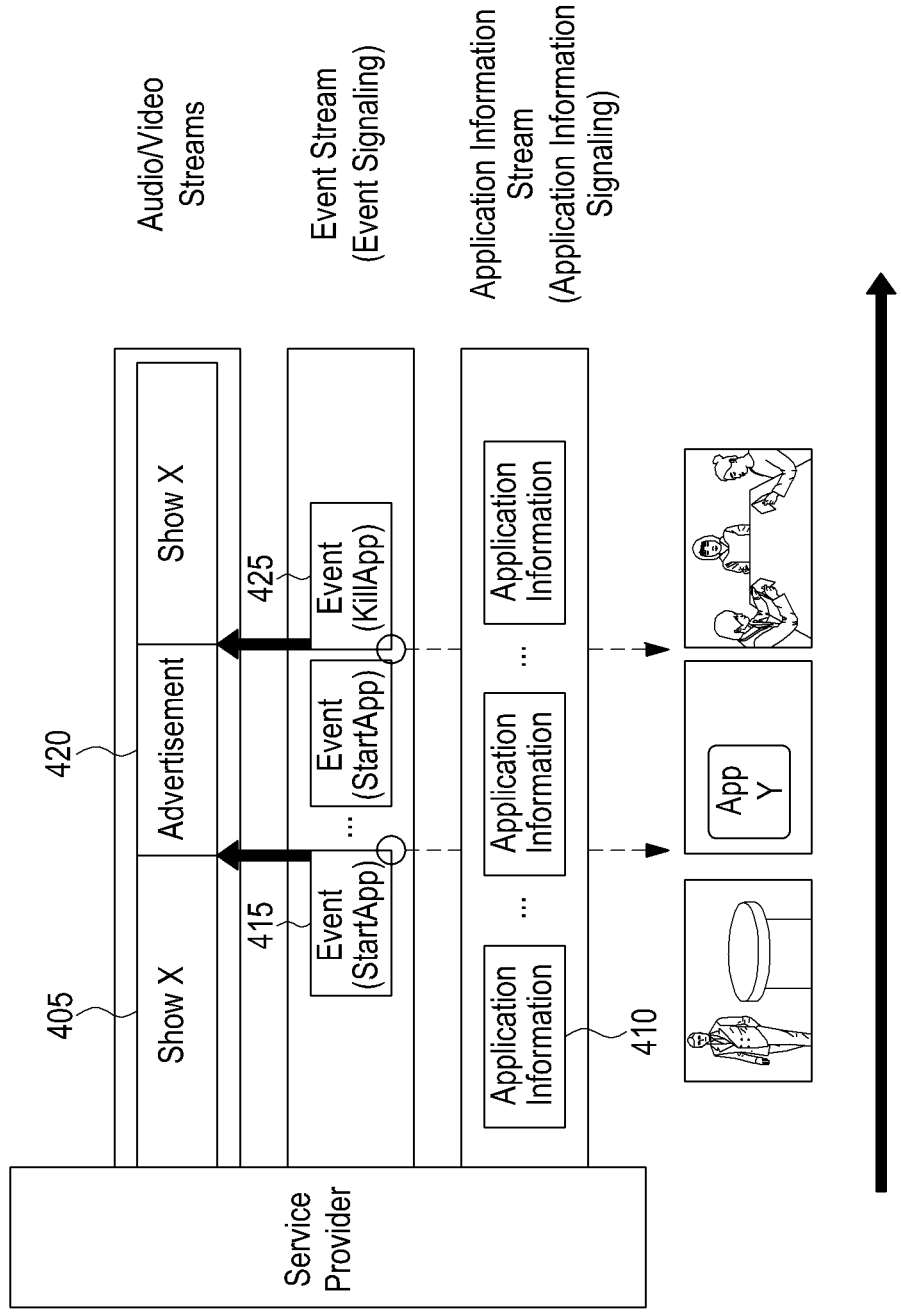
FIG. 4 schematically illustrates an operating process of a terminal for running an application program service in an MMT system according to an embodiment of the present disclosure.

FIG. 4 schematically illustrates an operating process of a terminal for running an application program service in an MMT system according to an embodiment of the present disclosure.

Referring to FIG. 4, it will be noted that an operating process of a terminal shown in FIG. 4 is an operating process of a terminal for running an application program service for providing a targeted advertisement at specific time.

Referring to FIG. 4, a terminal receives audio streams and video streams of a requested broadcast program (shown as "Show X" in FIG. 4) from a service provider and presents the audio streams and video streams at operation 405. The terminal acquires signaling information on an application program service related to the broadcast program through an application information stream as a channel which provides signaling related to an application program service, and receives data required for running the application program service using a broadcast network or a communication network, if any, at operation 410. For convenience, signaling information and data for an application program service may be referred to as application information.

The terminal receives event information transmitted through an event stream as a channel which provides an event while presenting the broadcast program, and performs an operation according to the received event information at operation 415. For example, in FIG. 4, the terminal receives event information related to running of an application program service Y which provides additional information of an advertised product at a specific part of the Show X, for example, at time when an advertisement starts. The terminal runs the application program service Y, i.e., an advertisement service, based on the event information at operation 420. Upon receiving a terminating event for the application program service Y after predetermined time, the terminal terminates the application program service Y at operation 425.

An MMT system defines various signaling messages related to media consumption and media delivery. However, signaling messages which have been proposed up to now provide configuration information for a package and information required for receiving each asset included in the package. An MPT used in an MPT message defines configuration information for each asset included in a package and location information required for receiving each asset. Additional information other than basic information such as the configuration information for each asset and the location information required for receiving each asset is provided using a descriptor, and an MPT message defines a container format which may store various descriptors.

MPEG CI which may be used in an MPI table may include location information on a logical screen of a terminal and time information related to presentation of each asset included in a package. However, the main object of the MPEG CI is to provide control information an asset which is transported based on an MMT scheme, and may be difficult to be applied to an application program service which is transported through a transport protocol other than an MMT protocol.

So, an embodiment of the present disclosure proposes a scheme for transmitting information related to an application program service and event information for controlling an operation of the application program service based on an MMT scheme, and this will be described below.

An inner structure of an apparatus for receiving information related to an application program service in an MMT system according to an embodiment of the present disclosure will be described with reference to FIG. 5.

Figure 5:
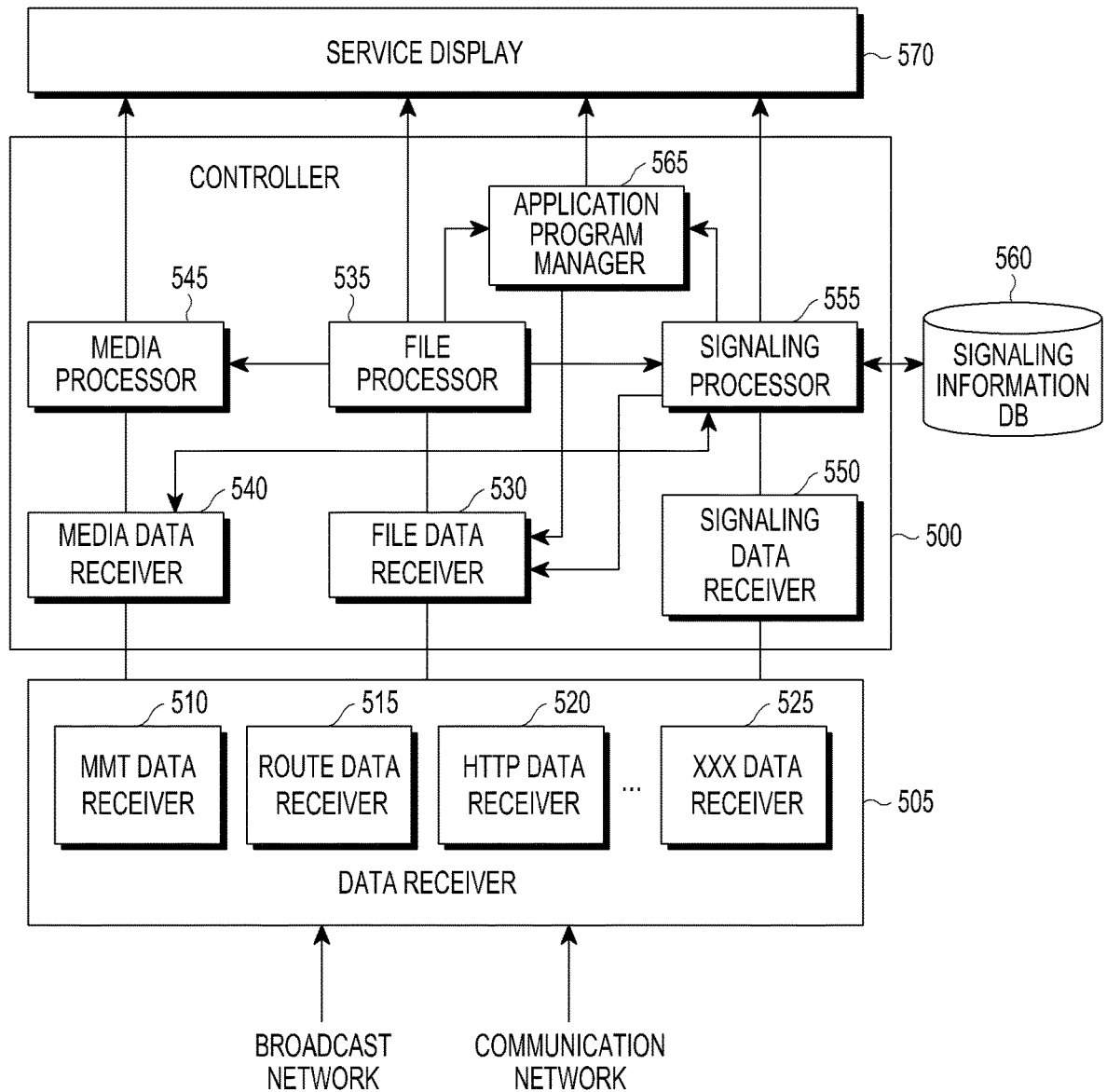
FIG. 5 schematically illustrates an inner structure of an apparatus for receiving information related to an application program service in an MMT system according to an embodiment of the present disclosure.

FIG. 5 schematically illustrates an inner structure of an apparatus for receiving information related to an application program service in an MMT system according to an embodiment of the present disclosure.

Referring to FIG. 5, for example, the apparatus for receiving the information related to the application program service may a terminal.

The apparatus includes a data receiver 505, a controller 500, a signaling information database (DB) 560, and a service display 570.

The data receiver 505 may include at least one of an MMT data receiver 510, a real-time object delivery over unidirectional transport (ROUTE) data receiver 515, a hypertext transfer protocol (HTTP) data receiver 520, and an XXX data receiver 525 in order to receive a packet transported through a communication network or broadcast network based on at least one of transport protocols such as an MMT protocol, a ROUTE protocol, and an HTTP, and outputs a received packet to a file data receiver 530, a media data receiver 540, or a signaling data receiver 550 based on a type of the received packet. Here, the XXX data receiver 525 denotes a data receiver for receiving a packet transported based on a transport protocol other than the MMT protocol, the ROUTE protocol, and the HTTP.

The file data receiver 530 acquires data included in the packet by processing the packet output from the data receiver 505, and outputs the data to a file processor 535. The file data receiver 530 receives an MMTP packet transported in a generic file delivery (GFD) mode defined in an MMT scheme, configures an MMTP payload based on the MMTP packet, and outputs the MMTP payload to the file processor 535. The file data receiver 530 receives a packet transported through one of various file transport protocols, extracts desired data from the received packet, and outputs the extracted data to the file processor 535. The file processor 535 configures files based on the data output from the file data receiver 530.

Each of the media data receiver 540 and the media processor 545 processes media data. For example, in a case that media data is an MPU defined in an MMT scheme, the media processor 545 may process media data transported in an MPU mode of an MMTP. At this time, the media data receiver 540 generates an MPU by configuring an MMTP payload based on an MMTP packet output from the MMT data receiver 510 within the data receiver 505, and the media processor 545 presents the MPU through the service display 570.

In a case that media data is transported through a file, the file processor 535 outputs a media file to the media processor 545, and the media processor 545 presents the media file through the service display 570.

In a case that media data follows a dynamic adaptive streaming over HTTP (DASH) format defined in ISO/IEC 23009-1, the media processor 545 may process the media data transported based on a ROUTE protocol. At this time, the media processor 545 generates a DASH segment by processing a ROUTE packet output from the ROUTE data receiver 515, and presents the DASH segment through the service display 570.

The media data receiver 540 may output a media file to the media processor 545 after generating all of the media file following ISO base media file format (ISOBMFF) like an MPU or a DASH segment, or output a part of a media file to the media processor 545 before generating all of the media file in order to decrease time required for channel change.

If a packet output from the data receiver 505 includes signaling information, the packet is output to the signaling data receiver 550 thereby being used for the signaling data receiver 550 to reconfigure signaling information. The signaling information is output to the signaling processor 555, and an additional operation is performed according to the signaling information. For example, if the signaling information is transported based on an MMTP, the signaling data receiver 550 receives an MMTP packet including signaling information from the MMT data receiver 510, and reconfigures an MMTP payload based on the received MMTP packet, and the signaling processor 555 parses the signaling information included in the MMTP payload to store necessary information at the signaling information DB 560.

If signaling information is included in a file, the signaling processor 555 inputs a file including signaling information output from the file processor 535, and parses the signaling information from the file to store necessary information at the signaling information DB 560.

The signaling processor 555 interacts with other configuration elements based on the parsed signaling information to perform an additional operation. For example, upon receiving signaling information related to an application program service, the signaling processor 555 outputs information which is required for receiving data required for running the application program service to the file data receiver 530 thereby the file data receiver 530 receives the data required for running the application program service.

Meanwhile, event information related to control for an application program service may be transmitted through a dedicated signaling channel or media data. That is, the event information related to the control for the application program service may be included in the media data. For example, in an MMT scheme, the event information related to the control for the application program service may be transmitted through a signaling message or an MPU including media data. That is, in the MMT scheme, the event information related to the control for the application program service may be included in the MPU. For another example, in a DASH scheme, signaling information may be transmitted through an MPD or a DASH segment including media data. That is, in the DASH scheme, the signaling information may be included in an MPD or a DASH segment.

So, in a case that event information is included in media data, the media data receiver 540 extracts the event information and outputs the event information to the signaling processor 555 thereby the event information is output to the application program manager 565 and the event information is used for controlling an operation of an application program service.

The application program manager 565 stores and manages the overall information for an application program service, manages an operation of each application program service, and displays information on each application program service through the service display 570. For this, the application program manager 565 interacts with the signaling processor 555 and the file processor 535 to receive data and signaling information required for providing the application program service.

A process for transmitting signaling information and event information related to an application program service in an MMT system according to an embodiment of the present disclosure will be described below.

1) Transmission of signaling information related to an application program service Information related to an application program service includes main attributes for an application program service such as a name, a transport scheme, a life cycle, and the like of the application program service.

In an embodiment of the present disclosure, an application information table (AIT) message as a signaling message transmitted through an MMT signaling session may be used for transmitting information related to an application program service. For convenience, it will be noted that the term AIT may be interchangeable with the term AI table.

Table 1 shows an example of an AIT message and a format of an AI table included in the AIT message.

TABLE 1

| Syntax | No. of Bits | Format |
| --- | --- | --- |
| AIT_message { | | |
|   message_id | 16 | Uimsbf |
|   version | 8 | Uimsbf |
|   length | 16 | Uimsbf |
|   extension { | | |
|   } | | |
|   message_payload { | | |
|     AI_table( ) | | |
|   } | | |
| } | | |

In Table 1, a message_id field indicates an ID of the AIT message, a version field indicates a version of the AIT message, and a length field indicates a length of the AIT message. The length field indicates a length from the next location next after the length field to end of the AIT message, and may be expressed as, for example, a length in bytes.

In Table 1, a message_payload field indicates a payload of the AIT message, and an AI_table( ) field includes an AIT.

The AIT message may further include an ID for identifying a service to which the AIT message is applied. The AIT message may further include a 1-bit flag indicating whether a uniform resource identifier (URI) for identifying the AIT message exists at an extension part. For example, if the 1-bit flag is on, a field indicating the URI may be further included in the AIT message.

Information on all application program services included in an MMT package may be transmitted through one AI table or a plurality of AI tables. Here, it will be noted that an AI table including the information on all application program services may be referred to as complete AI table, and an AI table including a part of the information on all application program services may be referred to as subset AI table.

Each subset AI table is included in an independent AIT message.

Table 2 indicates an example of a format of an AI table.

TABLE 2

| Syntax | Value | No. of Bits | Format |
| --- | --- | --- | --- |
| AI_table { | | | |
|   table_id | | 8 | Uimsbf |
|   version | | 8 | Uimsbf |
|   length | N1 | 16 | Uimsbf |
|   reserved | '1111' | 4 | Bslbf |
|   AI_table_mode | | 2 | Uimsbf |
|   reserved | '11' | 2 | Bslbf |
|   AI_table_descriptors { | | | |
|   AI_table_descriptor_length | N2 | 16 | Uimsbf |
|     for (i = 0; i < N2; ++i) | | | |
|   AI_table_descriptor_bytes | | 8 | Uimsbf |
|   } | | | |
|   AI_count | N3 | 8 | Uimsbf |
|   for (i = 0; i < N3; ++i) { | | | |
|     application_attributes( ) | | | |
|   } | | | |
| } | | | |

In Table 2, a table_id field indicates a table_id, and the table_id denotes an ID of an AI table. A complete AI table and a subset AI table may have different table_ids. A value of the table_id field is sequentially allocated, so a subset AI table number of a subset AI table may be calculated based on the table_id field. For example, the subset AI table number may be calculated as "table_id–table_id of a base subset AI table". The base subset AI table denotes a subset AI table of which a subset AI table number is 0. For example, subset AI table numbers from 1 to 14 indicate subset AI tables, not the base subset AI table, and a subset AI table number 15 indicates a complete AI table.

In Table 2, a version field indicates a version of an AI table. If an AI table of a new version is received, an AI table is changed from an AI table of an existing version to the AI table of the new version. The version field may be analyzed identically to a version field included in an MPI table among existing MMT signaling tables (if the table_id field indicates a complete AI table, and if a value of a table_id field included in a subset-0 AI table is the same as the value of the table_id field (when a value of an AI_table_mode field is 1), or if all subset AI tables with lower-subset AI table numbers have the same version value of the value of the table_id field (when a value of an AI_table_mode field is 0), or if processing of the subset AI tables is independent (when a value of an AI_table_mode field is 2)).

Here, an AI_table_mode field indicates an AI_table_mode indicating a processing scheme of a fragmented AI table in a case that an AI table is fragmented, and is used similar to a PI_mode field included in an MPI table among existing MMT signaling tables. A detailed description of the PI_mode field will be omitted herein.

If subset-0 AI table has a newer version, all subset AI tables with higher subset AI table number up to 14 previously stored within an MMT receiving entity are treated as outdated except for a case that an AI_table_mode is independent mode. Here, the MMT receiving entity includes a terminal. If the subset AI table number is not 0 and a value of the AI_table_mode is 1, contents of the subset AI table with a version different from a version of a subset-0 AI table stored in the MMT receiving entity will be ignored. If the subset AI table number is not 0 and a value of the AI_table_mode is field 0, contents of a subset AI table with a version different from versions of subset AI tables with lower-subset AI table numbers stored in the MMT receiving entity will be ignored. It will be modulo-256 incremented per version change.

In table 2, a length field indicates a length of an AI table, and indicates a length from the location after the length field to end of the AI table. For example, the length field may indicate a length in bytes.

In a sequential_order_processing_mode, if a subset AI table number of the AI table is not 0, the MMT receiving entity will receive all subset AI tables with lower subset AI table number that have the same version as the AI table before processing the AI table. For example, the MMT receiving entity may not process a subset-3 AI table if the MMT receiving entity does not receive a subset-2 AI table with the same version. In an order_irrelevant_processing_ mode, if a subset AI table number of the AI table is not 0, the MMT receiving entity needs to immediately process the AI table after receiving the AI table as long as a subset-0 AI table stored in the MMT receiving entity has the same version as the AI table. In an independent_processing_mode, versions of each of subset AI tables are managed individually. In the independent_processing_mode, a fragmented AI table is applied.

An example of a value and description used in the AI_table_mode field may be shown as Table 3.

TABLE 3

| AI_table mode | Description |
| --- | --- |
| 00 | "sequential_order_processing_mode" |
| 01 | "order_irrelevant_processing_mode" |
| 10 | "independent_processing_mode" |
| 11 | Reserved |

Further, in Table 2, an AI_table_descriptor_bytes field indicates a descriptor of the AI table, an AI_count field indicates the number of application program services included in the AI table, and an application_attributes( ) field indicates an attribute of each application program service.

As described above, the AI table may include various attributes related to an application program service, and the various attributes are included in the application_attributes( ) field. The various attributes may include a name of an application program service, transport information and a priority of data related to the application program service, and the like.

Table 4 shows an example of an application_attributes( )

TABLE 4

| Syntax | Description |
| --- | --- |
| application_attributes( ) { | |
| app_name | A name of an application program service |
| app_id | An ID of an application program service |
| related_MMT_assets_count | The number of assets included in an MMT package related to an application program service (N1) If a value of the related_MMT_assets_count is set to 0, it means that an application program service is not related to a package and may be independently run. |
| for (i = 0; i < N1; ++i) | |
| asset_id | Asset ID |
| application_transport_methods_count | The number of transport methods for data or file required to run an application program service (N2) |
| for (i = 0; i < N2; ++i) | |
| application_transport | Detailed information for transport of data or file related to an application program service using a broadcast network or a communication network |
| application_priority | A priority of an application program service |
| application_control_code | A life cycle of an application program service (for example, a life cycle such as AutoStart, Present, Kill, Suspend, Prefetch, Destroy, Disabled, and the like) Meaning of the life cycle follows an ETSI TS 102 809 standard. |
| application_type | A type of an application program service |
| AI_descriptor_length | |
| for (i = 0; i < N6; ++i) | |
| AI_descriptor_bytes | A descriptor of an application program service |
| } | |
| } | |

In an embodiment of the present disclosure, information related to an application program service may be transmitted through an MPT message as a signaling message related to an MMT package.

An MPT message includes a descriptor indicating whether an application program service exists within an MMT package. A terminal needs to receive an MPT message for presenting a broadcast message transported based on an MMT scheme, and may more quickly detect whether there is the application program service since the descriptor indicating whether the application program service exists is included in the MPT message.

Upon detecting that the application program service exists within the MMT package through the MPT message, the terminal may acquire detailed information related to the application program service by receiving the described AIT message.

The MPT message may further include information which needs to be firstly provided to the terminal among information included in an AIT, if any, in addition to notification of whether the application program service exists. The information which needs to be firstly provided may be information useful for performance improvement, quality of experience (QoE) improvement of the terminal, and/or the like.

Table 5 shows an example of a format of an application_service_descriptor as a descriptor which may be included in an MPT message.

TABLE 5

| Syntax | Value | No. of Bits | Format |
|---|---|---|---|
| application_service_descriptor( ) { | | | |
| descriptor_tag | | 16 | uimsbf |
| descriptor_length | | 8 | uimsbf |
| application_service_available | | 1 | bslbf |
| } | | | |

In Table 5, a descriptor_tag field indicates a tag for identifying an inband_event_descriptor field, a descriptor_length field indicates a length of the inband_event_descriptor field, and an application_service_descriptor field indicates whether an application program service exists within a package. For example, if a value of the application_service_descriptor field is 0, it means that the application program service does not exist within the package. If the value of the application_service_descriptor field is 1, it means that the application program service exists within the package. Information related to the application program service is transmitted through an AIT message.

2) Transmission of Event Information

Event information may be transmitted based on two schemes according to whether time at which an event occurs may be known in advance.

Firstly, in a case that time at which an event occurs may be known in advance such as recorded broadcast, a static event transmitting scheme is used.

Secondly, in a case that time at which an event occurs may not be known in advance such as live broadcast, a dynamic event transmitting scheme is used.

The event information is notified to an application program service.

In an embodiment of the present disclosure, event information may be transmitted through an MMT signaling message transmitted through an MMT signaling channel, i.e., an application event information (AEI) message. The AEI message may be applied to both a static event transmitting scheme and a dynamic event transmitting scheme. In the dynamic event transmitting scheme, event information may be included in media data in which an event occurs, for example, an MPU.

Tables 6 and 7 shows an example of a format of an MMT signaling message including event information, for example, an AEI message and an application event (AE) table included in the AEI message.

TABLE 6

| Syntax | No. of Bits | Format |
|---|---|---|
| AEI_message { | | |
| message_id | 16 | Uimsbf |
| Version | 8 | Uimsbf |
| Length | 16 | Uimsbf |
| extension { | | |
| } | | |
| message_payload { | | |
| AE_table( ) | | |
| } | | |
| } | | |

In Table 6, a message_id field indicates an ID of the AEI message, a version field indicates a version of the AEI message, and a length field indicates a length of the AEI message. The length field indicates a length from the location after the length field to end of the AEI message. For example, the length field may indicate a length in bytes. An AE_table( ) field includes an AE table.

In an embodiment of the present disclosure, the AEI message may further include an ID for identifying a service to which the AEI message is applied at an extension part. The AEI message may further include a 1-bit flag indicating whether a URI for identifying the AEI message at the extension part. If the 1-bit flag is on, a field indicating the URI may be further included in the AEI message.

TABLE 7

| Syntax | Value | No. of Bits | Format |
|---|---|---|---|
| AE_table { | | | |
| table_id | | 16 | uimsbf |
| version | | 8 | uimsbf |
| length | | 16 | uimsbf |
| reserved | 111111 | 6 | bslbf |
| number_of_app_events | N1 | 8 | uimsbf |
| for (i=0; i<N1;++i) { | | | |
| AE descriptor( ) | | | |
| } | | | |
| } | | | |

In table 7, a table_id field indicates an ID of an AE table. In table 7, a version field indicates a version of the AE table, and a length field indicates a length of the AE table. The length field indicates a length from the next location after the length field to end of the AE table. For example, the length field may indicate a length in bytes. In table 7, a number_of_app_events field indicates the number of events included in the AE table, and an AE_descriptor( ) field includes information of each event.

Event information is stored at an AE_descriptor( ) field, and may include various information related to the event such as an ID of an application program service related to the event, time and duration to which the event is applied, an event operation, and the like.

Table 8 shows an example of an AE_descriptor( ).

TABLE 8

| Syntax | Value | No. of Bits | Format |
|---|---|---|---|
| AE_descriptor( ) { | | | |
| descriptor_tag | | 16 | uimsbf |
| descriptor_length | | 8 | uimsbf |

TABLE 8-continued

| Syntax | Value | No. of Bits | Format |
|---|---|---|---|
| application_identifier( ) | | | |
| scheme_id_uri_length | N1 | 8 | uimsbf |
| for (i=0;i<N1;++i) | | | |
| scheme_id_uri_byte | | 8 | uimsbf |
| event_value_length | N2 | 8 | Uimsbf |
| for (i=0;i<N2;++i) | | | |
| event_value_byte | | 8 | uimsbf |
| event_id | | 32 | uimsbf |
| event_presentation_time | | 64 | uimsbf |
| event_duration | | 32 | uimsbf |
| event_data | | | |
| } | | | |

In table 8, a descriptor_tag field indicates a tag for identifying an AE_descriptor( ) a descriptor_length field indicates a length of the AE_descriptor( ) and an application_identifier( ) field indicates a unique ID of an application to which an event will be applied.

Table 9 shows an example of a format of an application_identifier( ) field.

TABLE 9

| Syntax | No. of Bits | Format |
|---|---|---|
| application_identifier( ) { | | |
| organization_id | 32 | Uimbsf |
| application_id | 16 | Uimbsf |
| } | | |

In Table 8, a scheme_id_uri_length field indicates a length of a scheme_id_uri. For example, the scheme_id_uri_length field may indicate a length in bytes. In Table 8, a scheme_id_uri field defines meaning and grammar of a value transmitted through an event_data field, and an event_value_length field indicates a length of the event_data field. For example, the event_value_length field may indicate a length in bytes.

In Table 8, an event_value field indicates an event value. A range and meaning of the event value are determined by the scheme_id_uri. In Table 8, an event_id field indicates a unique ID of an event, an event_presentation_time field indicates media presentation time to which an event will be applied, an event_duration field indicates media presentation time during which an event is available, and an event_data indicates event contents.

In an embodiment of the present disclosure, event information may be transmitted through media data.

In an MMT protocol, media data is included in an MPU, and the MPU follows an ISOBMFF structure. Event information may be included in an evti box included in the MPU, and an example of a format of the evti box is shown in Table 10.

TABLE 10

Box Type: "evti"
Container: MPU
Mandatory: No
Quantity: Zero or more
Syntax:
  aligned (8) class EventInformationBox extends FullBox('evti', version=0, flags=0) {
    string scheme_id_uri
    string event_value
    unsigned int(32) event_id
    unsigned int(32) event_presentation_time_delta
    unsigned int(32) event_duration TABLE 10-continued unsigned int(32) event_data
    string application_identifier
  }

In table 10, a scheme_id_uri field defines meaning and grammar of a value transmitted through an event_data field, and an event_value field includes an event value. A range and meaning of the event value is determined by a scheme_id_uri. In Table 10, an event_id field indicates a unique ID of an event, and an event_presentation_time_delta field indicates difference between time at which an MPU is presented and time at which media to which the event will be applied, i.e., the MPU, is presented. That is, the event_presentation_time_delta field indicates start time of the event. An event_duration field indicates presentation time of media during which an event is available, i.e., a duration of the event, and an event_data field indicates event contents, i.e., an action initiated by the event. In table 10, an application_identifier field indicates an ID of an application program service to which the event will be applied.

In an embodiment of the present disclosure, event information is transmitted through an MPU included in an asset, and MMT signaling information may be used for informing that the event information is included in the MPU included in the asset.

For this, an MP table transmitting MMT package information includes an inband_event_descriptor as a descriptor used at an asset-level.

A terminal may detect that event information is included in an MPU included in an asset by receiving an inband_event_descriptor through an MP table. Upon detecting that the event information is included in the MPU included in the asset, the terminal receives the MPU and acquires event information from an evti box included in the MPU.

Table 11 shows an example of a format of an inband_event_descriptor.

TABLE 11

| Syntax | Value | No. of Bits | Format |
|---|---|---|---|
| inband_event_descriptor( ) { | | | |
| descriptor_tag | | 16 | Uimsbf |
| descriptor_length | | 8 | Uimsbf |
| scheme_id_uri_length | N1 | 8 | Uimsbf |
| for (i=0;i<N1;++i) | | | |
| scheme_id_uri_byte | | 8 | Uimsbf |
| event_value_length | N2 | 8 | Uimsbf |
| for (i=0;i<N2;++i) | | | |
| event_value_byte | | 8 | Uimsbf |
| } | | | |

In Table 11, a descriptor_tag field indicates a tag for identifying an inband_event_descriptor, a descriptor_length field indicates a length of the inband_event_descriptor, a scheme_id_uri_length field indicates a length of a scheme_id_uri, and a scheme_id_uri field defines meaning and grammar of a value transmitted through an event_data field. For example, the scheme_id_uri_length field may indicate a length in bytes.

In Table 11, an event_value_length field indicates a length of an event_data field, and an event_value field includes an event value. For example, the event_value_length field may indicate a length in bytes. A range and meaning of the event value is determined by a scheme_id_uri.

A process for processing event information based on an MMT signaling message in an MMT system according to an embodiment of the present disclosure will be described with reference to FIG. 6.

Figure 6:
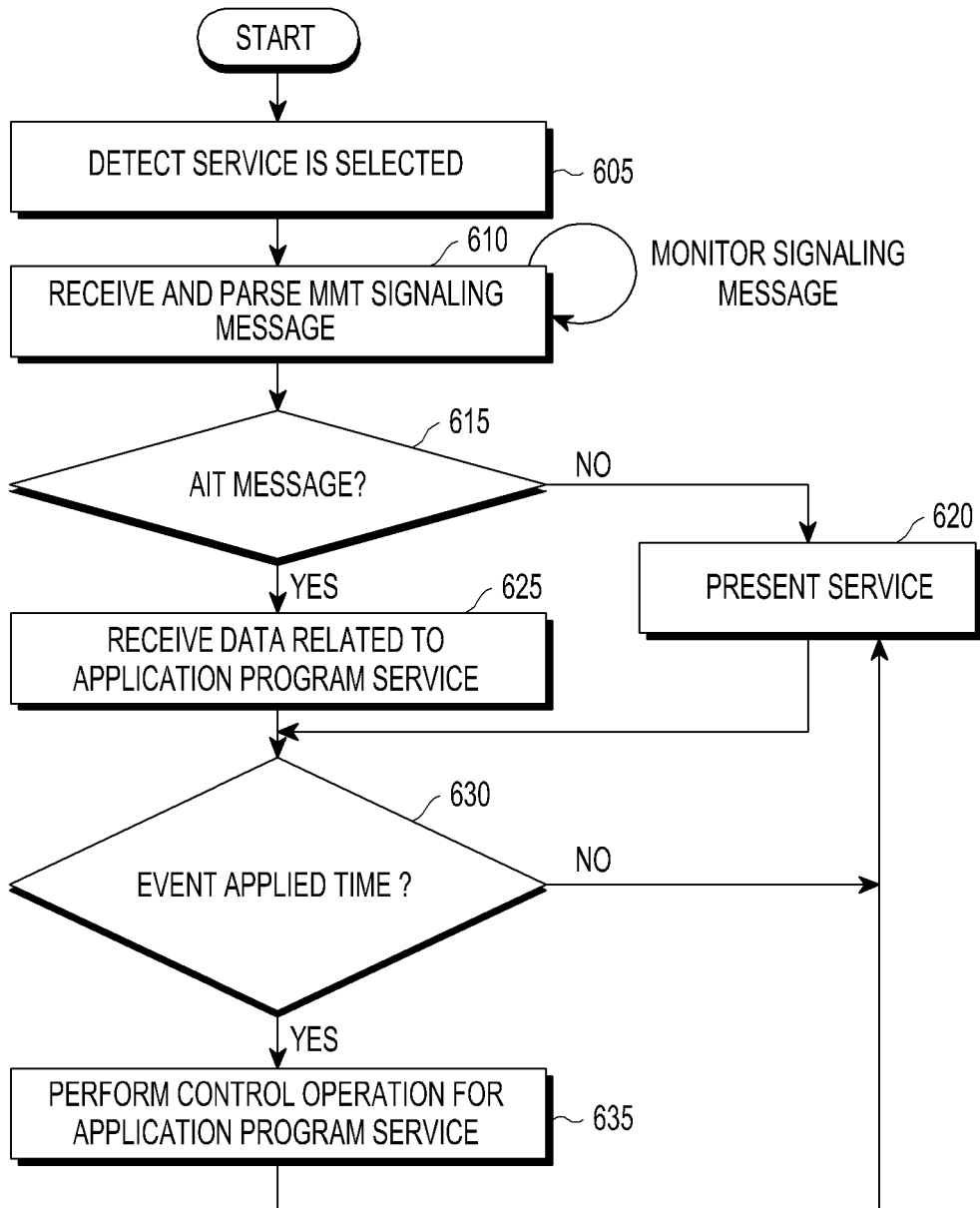
FIG. 6 schematically illustrates a process for processing event information based on an MMT signaling message in an MMT system according to an embodiment of the present disclosure.

FIG. 6 schematically illustrates a process for processing event information based on an MMT signaling message in an MMT system according to an embodiment of the present disclosure.

Referring to FIG. 6, a terminal detects that a service is selected at operation 605. The terminal monitors reception of an MMT signaling message related to the service, and parses a received MMT signaling message related to the service upon receiving the MMT signaling message at operation 610. The terminal determines whether the MMT signaling message includes an AIT message at operation 615.

If the MMT signaling message does not include the AIT message, the terminal presents a video/audio stream of the selected service at operation 620.

If the MMT signaling message includes the AIT message, the terminal receives data related to an application program service based on an AI table included in the AIT message at operation 625. The terminal may determine time that the terminal starts receiving data related to an application program service, whether the terminal immediately runs the application program service, and the like based on attributes of an application program included in the AI table and an input parameter at operation 625.

The terminal monitors reception of an AEI message as a signaling message including event information, and acquires information on event applied time from an AE table included in a received AEI message upon receiving the AEI message. The terminal determines whether it reaches the event applied time at operation 630.

If it reaches the event applied time, the terminal performs a control operation for the application program service based on an event at operation 635. The control operation for the application program service may include an operation for initiating the application program service, an operation for terminating the application program service, and/or the like.

If it does not reach the event applied time, the terminal proceeds to operation 620.

Although FIG. 6 illustrates a process for processing event information based on an MMT signaling message in an MMT system according to an embodiment of the present disclosure, various changes could be made to FIG. 6. For example, although shown as a series of operations, various operations in FIG. 6 could overlap, occur in parallel, occur in a different order, or occur multiple times.

A process for processing event information based on an MMT signaling message in an MMT system according to an embodiment of the present disclosure has been described with reference to FIG. 6, and a process for processing event information based on an MPU in an MMT system according to an embodiment of the present disclosure will be described with reference to FIG. 7.

Figure 7:
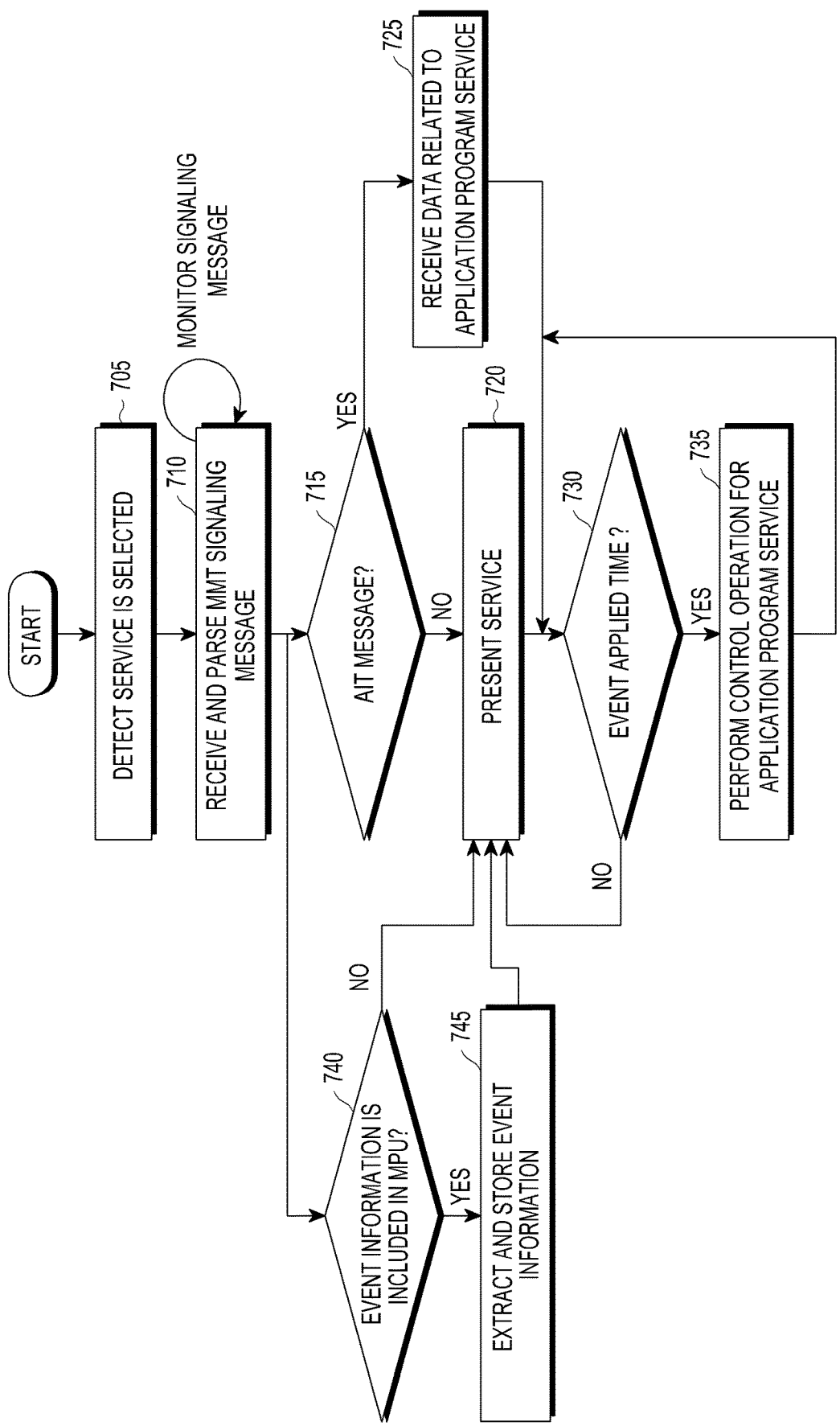
FIG. 7 schematically illustrates a process for processing event information based on a media processing unit (MPU) in an MMT system according to an embodiment of the present disclosure.

FIG. 7 schematically illustrates a process for processing event information based on an MPU in an MMT system according to an embodiment of the present disclosure.

Referring to FIG. 7, a terminal detects that a service is selected at operation 705. The terminal monitors reception of an MMT signaling message related to the service, and parses a received MMT signaling message related to the service upon receiving the MMT signaling message at operation 710. The terminal determines whether the MMT signaling message includes an AIT message at operation 715.

If the MMT signaling message does not include the AIT message, the terminal presents a video/audio stream of the selected service at operation 720.

If the MMT signaling message includes the AIT message, the terminal receives data related to an application program service based on an AI table included in the AIT message at operation 725. The terminal may determine time that the terminal starts receiving data related to an application program service, whether the terminal immediately runs the application program service, and the like based on attributes of an application program included in the AI table and an input parameter at operation 725.

The terminal which receives the MMT signaling message at operation 710 determines whether event information is included in an MPU based on the MMT signaling message at operation 740. That is, the terminal determines whether the event information is included in the MPU included in an asset by analyzing an asset-level descriptor included in an MP table included in the MMT signaling message.

If the asset-level descriptor indicates that the event information is included in the MPU, the terminal extracts and stores event information from an MPU included in the asset whenever receiving the MPU included in the asset at operation 745.

The terminal periodically determines whether it reaches event applied time while presenting the service at operation 730. For example, information on the event applied time may be acquired from an AE table within an AEI message. If it reaches the event applied time, the terminal performs a control operation for an application program service by applying a related event at operation 735.

Although FIG. 7 illustrates a process for processing event information based on an MPU in an MMT system according to an embodiment of the present disclosure, various changes could be made to FIG. 7. For example, although shown as a series of operations, various operations in FIG. 7 could overlap, occur in parallel, occur in a different order, or occur multiple times.

In an embodiment of the present disclosure, a signaling table and descriptors are encapsulated as an mmt_atsc3_message( ) which may be configured as Table 12, and the mmt_atsc3_message( ) may be transmitted in a signaling message mode of an MMTP.

TABLE 12

| Syntax | No. of Bits | Format |
|---|---|---|
| mmt_atsc3_message( ) { | | |
|   message_id | 16 | uimsbf |
|   Version | 8 | uimsbf |
|   length | 32 | uimsbf |
|   message payload { | | |
|     service_id | 16 | uimsbf |
|     atsc3_message_content_type | 16 | uimbsf |
|     atsc3_message_content_version | 8 | uimbsf |
|     atsc3_message_content_compression | 8 | uimbsf |
|     URI_length | 8 | uimbsf |
|     for (i=0;i< URI_length;i++) { | | |
|       URI_byte | 8 | uimsbf |
|     } | | |
|     atsc3_message_content_length | 32 | uimsbf |
|     for (i=0;i<atsc3_message_content_length;i++) { | | |
|       atsc3_message_content_byte | 8 | uimsbf |
|     } | | |
|     for    (i=0;i<length-10-URI_length-atsc3_message_content_length) { | | |
|       Reserved | 8 | uimsbf |
|     } | | |
|   } | | |
| } | | |

In Table 12, a message_id field indicates an ID of the mmt_atsc3_message( ). For example, the message_id field may be implemented with a 16-bit field. In Table 12, a version field indicates a version of the mmt_atsc3_message( ). For example, the version field may be implemented with an 8-bit field.

In Table 12, a length field indicates a length of the mmt_atsc3_message( ). For example, the length field may indicate a length in bytes, and may be implemented with a 32-bit field. The length of the mmt_atsc3_message( ) may be the number of bytes from the next byte after the length field to the last byte of the mmt_atsc3_message( ).

In Table 12, a service_id field indicates an ID for identifying a service to which information transmitted through a payload included in the mmt_atsc3_message( ) is applied. For example, the service_id field may be implemented with a 16-bit field. The service_id field is set to a value equal to an atsc:serviceId attribute of a USD to be described.

In Table 12, an atsc3_message_content_type field indicates a type of information transmitted through a payload included in the mmt_atsc3_message( ). The atsc3_message_content_type field may be implemented with a 16-bit field.

For example, the atsc3_message_content_type field may indicate a value as shown in Table 13.

TABLE 13

| atsc3_message_content_type | Meaning |
| --- | --- |
| 0x0000 | Reserved |
| 0x0001 | UserServiceDescription |
| 0x0002 | MPD |
| 0x0003 | Application Information Table |
| 0x0004 | Application Event Information |
| 0x0005 | Video Stream Properties Descriptor |
| 0x0006 | ATSC Staggercast Descriptor( ) |
| 0x007~0xFFFF | Reserved for future use |

In Table 12, an atsc3_message_content_version field indicates a version of information transmitted through a message payload included in the mmt_atsc3_message( ). For example, the atsc3_message_content_version field may be expressed with an 8-bit field. The message payload may be differentiated based on combination of the service_id and the atsc3_message_content_type.

In Table 12, an atsc3_message_content_compression field indicates a compression scheme which is applied to an atsc3_message_content_byte field included in the message payload included in the mmt_atsc3_message( ). For example, the atsc3_message_content_compression field may be implemented with an 8-bit field.

In Table 12, a URI_length field indicates a length of a URI used for identifying the message payload. For example, the URI_length field may be implemented with an 8-bit field. In a case that the URI is not used, a value of the URI_length field may be set to 0.

In Table 12, a URI_byte field indicates each byte of the URI used for identifying the message payload. The URI_byte field may be implemented with an 8-bit field. For example, the URI_byte field is expressed as a universal coded character set+transformation format (UTF)-8 character, and does not include a terminating null character.

In Table 12, an atsc3_message_content_byte field indicates each byte of information transmitted through the message payload. For example, the atsc3_message_content_byte field may be implemented with an 8-bit field.

Meanwhile, an mmt_atsc3_message( ) shown in Table 11 may transmit signaling information of all formats including an extensible markup language (XML) format, a binary format, and the like through a message payload, and a format of each signaling information may be identified using the atsc3_message_content_type.

In a case that the inband_event_descriptor is transmitted through a payload included in the mmt_atsc3_message( ) in Table 12, according to an embodiment of the present disclosure, the inband_event_descriptor may have a format as shown in Table 14.

TABLE 14

| Syntax | Value | No. of Bits | Format |
| --- | --- | --- | --- |
| inband_event__descriptor( ) { | | | |
| descriptor_tag | | 16 | Uimsbf |
| descriptor_length | | 8 | Uimsbf |
| number_of_assets | N1 | 8 | Uimsbf |
| for (i=0;i<N1;++i) { | | | |
| asset_id_length | N2 | 8 | Uimsbf |
| for (j=0;j<N2;++j) { | | | |
| asset_id_byte | | 8 | Uimsbf |
| } | | | |
| scheme_id_uri_length | N3 | 8 | Uimsbf |
| for (j=0;j<N3;++j) { | | | |
| scheme_id_uri_byte | | 8 | Uimsbf |
| } | | | |
| event_value_length | N4 | 8 | Uimsbf |
| for (j=0;i<N4;++j) { | | | |
| event_value_byte | | 8 | Uimsbf |
| } | | | |
| } | | | |
| } | | | |

In Table 14, a descriptor_tag field indicates a tag for identifying the inband_event_descriptor, a descriptor_length field indicates a length of the inband_event_descriptor, and a number_of_assets field indicates the number of assets described in the inband_event_descriptor. In Table 14, an asset_id_length field indicates a length of an asset ID, and an asset_id_byte field indicates each byte of the asset ID. For example, the asset_id_length field may indicate a length in bytes.

In Table 14, a scheme_id_uri_length field indicates a length of a scheme_id_uri, and a scheme_id_uri field defines meaning and grammar of a value transmitted through an event_data field. For example, the scheme_id_uri_length field may indicate a length in bytes.

In Table 14, an event_value_length field indicates a length of the event_data field, and the event_data field includes an event_value. A range and meaning of the event_value are determined by the scheme_id_uri, and the event_value_length field may indicate a length in bytes.

In an embodiment of the present disclosure, event information is transmitted through an MPU included in an asset, and MMT signaling information may be used for informing that the event information is included in the MPU included in the asset. For this, an mmt_atsc3_message( ) includes an inband_event_descriptor as a descriptor used at an asset-level in a payload.

A terminal may acquire the inband_event_descriptor through the mmt_atsc3_message( ) receives an MPU included in an asset upon detecting that event information is included in the MPU included in the asset, and may acquire the event information from an evti box included in the MPU.

An inner structure of a transmitting apparatus in an MMT system according to an embodiment of the present disclosure will be described with reference to FIG. 8.

Figure 8:
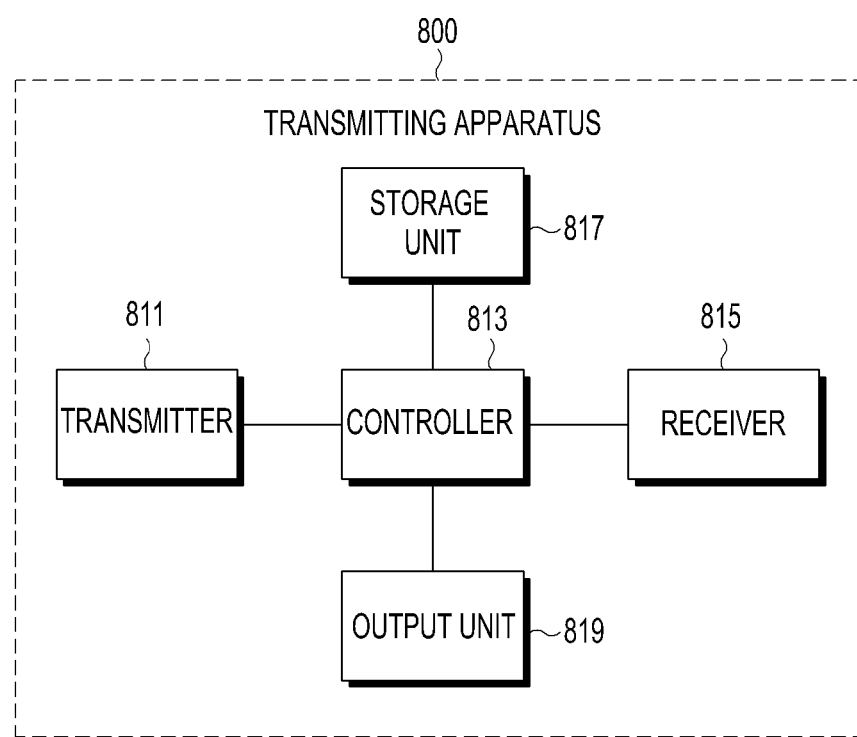
FIG. 8 schematically illustrates an inner structure of a transmitting apparatus in an MMT system according to an embodiment of the present disclosure.

FIG. 8 schematically illustrates an inner structure of a transmitting apparatus in an MMT system according to an embodiment of the present disclosure.

Referring to FIG. 8, a transmitting apparatus 800 may be an MMT transmitting entity, and the MMT transmitting entity may be a service provider, and/or the like.

The transmitting apparatus 800 includes a transmitter 811, a controller 813, a receiver 815, a storage unit 817, and an output unit 819.

The controller 813 controls the overall operation of the transmitting apparatus 800. More particularly, the controller 813 controls an operation related to an operation of transmitting and receiving event information in an MMT system according to an embodiment of the present disclosure. The operation related to the operation of transmitting and receiving the event information in the MMT system according to an embodiment of the present disclosure has been described with reference to FIGS. 1 to 7 and Tables 1 to 14, and a detailed description thereof will be omitted herein.

The transmitter 811 transmits various signals and various messages to other entities, for example, an MMT receiving entity and the like included in the MMT system under a control of the controller 813. For example, the MMT receiving entity may be a terminal, and/or the like. The various signals and various messages transmitted in the transmitter 811 have been described with reference to FIGS. 1 to 7 and Tables 1 to 14, and a detailed description thereof will be omitted herein.

The receiver 815 receives various signals and various messages from other entities, for example, an MMT receiving entity and the like included in the MMT system under a control of the controller 813. The various signals and various messages received in the receiver 815 have been described with reference to FIGS. 1 to 7 and Tables 1 to 14, and a detailed description thereof will be omitted herein.

The storage unit 817 stores various programs, various data, and the like related to the operation related to the operation of transmitting and receiving the event information performed in the MMT system according to an embodiment of the present disclosure under a control of the controller 813. The storage unit 817 stores various signals and various messages which are received by the receiver 815 from the other entities.

The output unit 819 outputs various signals and various messages related to the operation related to the operation of transmitting and receiving the event information performed in the MMT system according to an embodiment of the present disclosure under a control of the controller 813. The various signals and various messages output by the output unit 819 have been described with reference to FIGS. 1 to 7 and Tables 1 to 14, and a detailed description thereof will be omitted herein.

While the transmitter 811, the controller 813, the receiver 815, the storage unit 817, and the output unit 819 are described in the transmitting apparatus 800 as separate units, it is to be understood that this is merely for convenience of description. In other words, two or more of the transmitter 811, the controller 813, the receiver 815, the storage unit 817, and the output unit 819 may be incorporated into a single unit.

The transmitting apparatus 800 may be implemented with one processor.

An inner structure of a transmitting apparatus in an MMT system according to an embodiment of the present disclosure has been described with reference to FIG. 8, and an inner structure of a receiving apparatus in an MMT system according to an embodiment of the present disclosure will be described with reference to FIG. 9.

Figure 9:
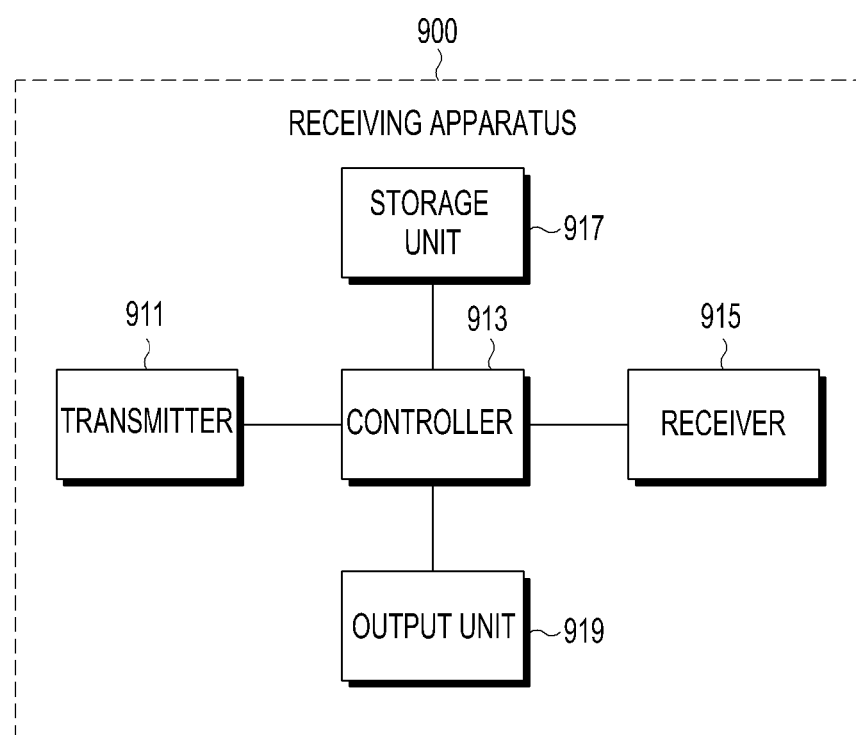
FIG. 9 schematically illustrates an inner structure of a receiving apparatus in an MMT system according to an embodiment of the present disclosure.

FIG. 9 schematically illustrates an inner structure of a receiving apparatus in an MMT system according to an embodiment of the present disclosure.

Referring to FIG. 9, a receiving apparatus 900 may be an MMT receiving entity, and the MMT receiving entity may be a terminal, and/or the like.

The receiving apparatus 900 includes a transmitter 911, a controller 913, a receiver 915, a storage unit 917, and an output unit 919.

The controller 913 controls the overall operation of the receiving apparatus 900. More particularly, the controller 913 controls an operation related to an operation of transmitting and receiving event information in an MMT system according to an embodiment of the present disclosure. The operation related to the operation of transmitting and receiving the event information in the MMT system according to an embodiment of the present disclosure has been described with reference to FIGS. 1 to 7 and Tables 1 to 14, and a detailed description thereof will be omitted herein.

The transmitter 911 transmits various signals and various messages to other entities, for example, an MMT transmitting entity and the like included in the MMT system under a control of the controller 913. For example, the MMT transmitting entity may be a service provider, and/or the like. The various signals and various messages transmitted in the transmitter 911 have been described with reference to FIGS. 1 to 7 and Tables 1 to 14, and a detailed description thereof will be omitted herein.

The receiver 915 receives various signals and various messages from other entities, for example, an MMT transmitting entity and the like included in the MMT system under a control of the controller 913. The various signals and various messages received in the receiver 915 have been described with reference to FIGS. 1 to 7 and Tables 1 to 14, and a detailed description thereof will be omitted herein.

The storage unit 917 stores various programs, various data, and the like related to the operation related to the operation of transmitting and receiving the event information performed in the MMT system according to an embodiment of the present disclosure under a control of the controller 913. The storage unit 917 stores various signals and various messages which are received by the receiver 915 from the other entities.

The output unit 919 outputs various signals and various messages related to the operation related to the operation of transmitting and receiving the event information performed in the MMT system according to an embodiment of the present disclosure under a control of the controller 913. The various signals and various messages output by the output unit 919 have been described with reference to FIGS. 1 to 7 and Tables 1 to 14, and a detailed description thereof will be omitted herein.

While the transmitter 911, the controller 913, the receiver 915, the storage unit 917, and the output unit 919 are described in the receiving apparatus 900 as separate units, it is to be understood that this is merely for convenience of description. In other words, two or more of the transmitter 911, the controller 913, the receiver 915, the storage unit 917, and the output unit 919 may be incorporated into a single unit.

The receiving apparatus 900 may be implemented with one processor.

As is apparent from the foregoing description, an embodiment of the present disclosure enables to transmit and receive a signal in a multimedia system.

An embodiment of the present disclosure enables to transmit and receive event information related to an event in a multimedia system.

An embodiment of the present disclosure enables to provide event information related to an event with a multimedia service in a multimedia system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disk ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a receiving apparatus in a multimedia system, the method comprising:
controlling, by an electronic device, a transceiver for receiving event information related to an event,
wherein the event includes notification to an application, the notification indicating that an action is to be taken,
wherein the event information is received in a first event information box included in a media presentation description (MPD) if the event information indicates a first event for dynamic adaptive streaming over hypertext transfer protocol (HTTP) (DASH)-based services, and
wherein the event information is received in a second event information box included in a media processing unit (MPU) in a moving picture experts group media transport (MMT) payload, if the event information indicates a second event for MMT-based services.

2. The method of claim 1, wherein the event information includes at least one of an identifier (ID) of the event, start time of the event, duration of the event, or event data of the event.

3. The method of claim 2, wherein the start time of the event includes difference between time that the MPU is presented and time that the event is applied in the MPU.

4. The method of claim 2, wherein the event data includes the action.

* * * * *